United States Patent [19]
Pawlowski, Jr. et al.

[11] Patent Number: 5,583,545
[45] Date of Patent: Dec. 10, 1996

[54] INK LEVEL DETECTION IN A PRESSURE REGULATED PEN

[75] Inventors: Norman E. Pawlowski, Jr.; Mark Hauck; Bruce Cowger, all of Corvallis; Steven B. Elgee, Portland, all of Oreg.; Paul D. Gast, Vancouver, Wash.

[73] Assignee: Hewlett-Packard Company, Palo Alto, Calif.

[21] Appl. No.: 331,453

[22] Filed: Oct. 31, 1994

[51] Int. Cl.⁶ .............................. B41J 2/195; B41J 2/175
[52] U.S. Cl. ............................... 347/7; 347/86
[58] Field of Search .................... 347/7, 85, 87, 347/86; 73/299, 302; 137/393

[56] References Cited

U.S. PATENT DOCUMENTS

| | | | |
|---|---|---|---|
| 4,804,944 | 2/1989 | Golladay et al. | 340/264 |
| 4,940,997 | 7/1990 | Hamlin et al. | 346/140 R |
| 5,079,570 | 1/1992 | Mohr et al. | 346/140 R |
| 5,315,317 | 3/1994 | Terasawa et al. | 347/7 |

FOREIGN PATENT DOCUMENTS 62-271750  11/1987  Japan ......................... 347/7

Primary Examiner—Benjamin R. Fuller
Assistant Examiner—Craig A. Hallacher

[57] ABSTRACT

The present invention relates to Ink Level Detection in a Pressure Regulated Pen. A liquid level detector for a liquid containment device, such as an ink-jet pen, provides a signal indicative of a lowering level of liquid in the containment device. In exemplary embodiments, a refillable or replaceable ink reservoir supplies ink to the printhead of the pen under pressure. Electrical or electromagnetic devices are used individually or in combination with a pressure regulator apparatus to sense a back pressure in the containment device after the reservoir has gone dry to trigger a signal indicating a low or out-of-ink condition.

22 Claims, 6 Drawing Sheets

INK LEVEL DETECTION IN A PRESSURE REGULATED PEN

RELATED APPLICATIONS

This application is related to U.S. patent application Ser. No. 08/065,957, filed by Dana Seccombe et al, assigned to the common assignee of the present invention, titled Ink Pressure Regulator For Ink Jet Printheads, incorporated herein by reference in its entirety.

BACKGROUND OF THE INVENTION

1. Field of the Invention

The present invention relates generally to fluid level detectors, more particularly to out-of-fluid sensors for hard copy machines, and, more specifically, to an out-of-ink detector for an ink-jet pen.

2. Description of the Related Art

A universal problem in hard copy technology is the fact that ink supplies are not unlimited. The same applies for those types of hard copy machines that use wet or dry toners, dyes, or other colorants from a reservoir to produce a hard copy. As a result, at some point during an operational cycle, the machine will run out. This problem can be particularly egregious in ink-jet technology where a replaceable ink reservoir is employed.

The art of ink-jet technology is relatively well developed. Commercial products such as computer printers, graphics plotters, and facsimile machines employ ink-jet technology for producing hard copy. The basics of this technology are disclosed, for example, in various articles in the *Hewlett-Packard Journal*, Vol. 36, No. 5 (May 1985), Vol. 39. No. 4 (August 1988), Vol. 39, No. 5 (October 1988), Vol. 43, No. 4 (August 1992), Vol. 43, No. 6 (December 1992) and Vol. 45, No. 1 (February 1994) editions, incorporated herein by reference.

Running an ink-jet pen dry can damage the printhead mechanism. Even if the printhead mechanism is not damaged, the pen will have to be re-primed once the reservoir is refilled or replaced. This requires extra hardware, generally in the form of a pen service station, to be included in the printer mechanism. If a pen runs low on ink, the hard copy equipment user is also inconvenienced by poor print quality or an unusable partial print which, particularly in complex, large scale, engineering drawings, can be costly.

Some original equipment manufacturers have provided machine readable ink level sensors. Generally, these sensors rely on electrical properties of ink and foam reservoir material interactions within the pen. Accuracy of such devices is questionable. Such sensors are inapplicable to off-board ink reservoir systems.

Early ink-jet printers used off-pen reservoirs as demonstrated in U.S. Pat. No. 4,312,007. Moreover, it has been found that for some hard copy applications, such as large format plotting of engineering drawings and the like, there is a requirement for the use of much larger volumes of ink than can be contained within replaceable pens that have on-board ink reservoirs. Therefore, relatively large, off-pen, ink reservoir systems have also been developed more recently. As examples, refer to U.S. Pat. No. 4,831,389 which shows a multicolor off-board ink supply system; U.S. Pat. No. 4,929,963 which demonstrates an ink delivery system for an ink-jet printer using a low pressure recirculating pumping system; and U.S. Pat. No. 4,968,998, which teaches an ink-jet pen which is refillable at a service station [each assigned to the common assignee of the present invention and incorporated herein by reference.]

In the related application U.S. application Ser. No. 08/065,957, back pressure regulation of an ink-jet pen having an off-board ink reservoir has been demonstrated. In such systems, ink level and an out-of-ink condition sensing is even more critical. Therefore, in a printhead device, such as an ink-jet pen, which uses a replaceable or refillable ink supply, it is desirable to know when the supply is depleted before the printhead is operated in an out-of-ink condition.

SUMMARY OF THE INVENTION

In its basic aspects, the present invention provides a level sensing device for a fluid containment chamber having a fluid inlet and a fluid outlet. The fluid inlet couples the containment chamber to a reservoir having a supply of fluid. The fluid level sensing device incorporates a controller for controlling the flow of fluid through the containment chamber such that the chamber is substantially filled with fluid as long as a supply of fluid remains in the reservoir. A sensing device, operatively combined with the controller, is adapted to move the controller from its normal operation position to another predetermined position as the containment chamber is drained of fluid following depletion of the supply of fluid in the reservoir. A detecting device, such as a circuit breaker device, a magneto-resistive sensor, or a magnet and Hall-effect sensor combination, cooperates with the controller to provide a signal indicative that the controller has reached the predetermined position. The level sensing device is particularly suited to use in an ink-jet pen system using a pressurized ink reservoir.

It is an advantage of the present invention that ink-jet pen reliability is increased by preventing operation without ink and resultant potential damage to the pen's printhead.

It is another advantage of the present invention that the hard copy machine operator is provided with a warning that the ink supply should be replaced or replenished.

It is another advantage of the present invention that use of ink within a supply reservoir is maximized.

It is yet another advantage of the present invention that recognition of an out-of-ink condition allows an ink supply replacement before an ink-jet pen is starved and requires a re-priming operation.

It is a further advantage of a particular embodiment of the present invention that it can be used to sense a near-out-of-ink condition.

It is still another advantage of the present invention that throughput can be increased in that reservoir refill or replacement can be undertaken prior to initiation of a printing cycle during which the pen would have run out of ink.

Other objects, features and advantages of the present invention will become apparent upon consideration of the following detailed description and the accompanying drawings, in which like reference designations represent like features throughout the FIGURES.

DESCRIPTION OF THE DRAWINGS

FIG. 6 is a schematic plan view (side) of a third alternative embodiment of a combined inflatable member and electrical contact device of the present invention as shown in FIGS. 1 and 5 in which:

The drawings referred to in this description should be understood as not being drawn to scale except if specifically noted.

DETAILED DESCRIPTION OF THE INVENTION

Reference is made now in detail to a specific embodiment of the present invention, which illustrates the best mode presently contemplated by the inventor(s) for practicing the invention. Alternative embodiments are also briefly described as applicable. While the present invention is described in terms of exemplary ink-jet pen structures, it will be recognized by a person skilled in the art that the invention is readily adaptable to other replenishable ink pens and, in fact, many fluid pressure regulating mechanisms. Therefore, no limitation is intended by the exemplary embodiments described nor should any be implied.

Figure 1:
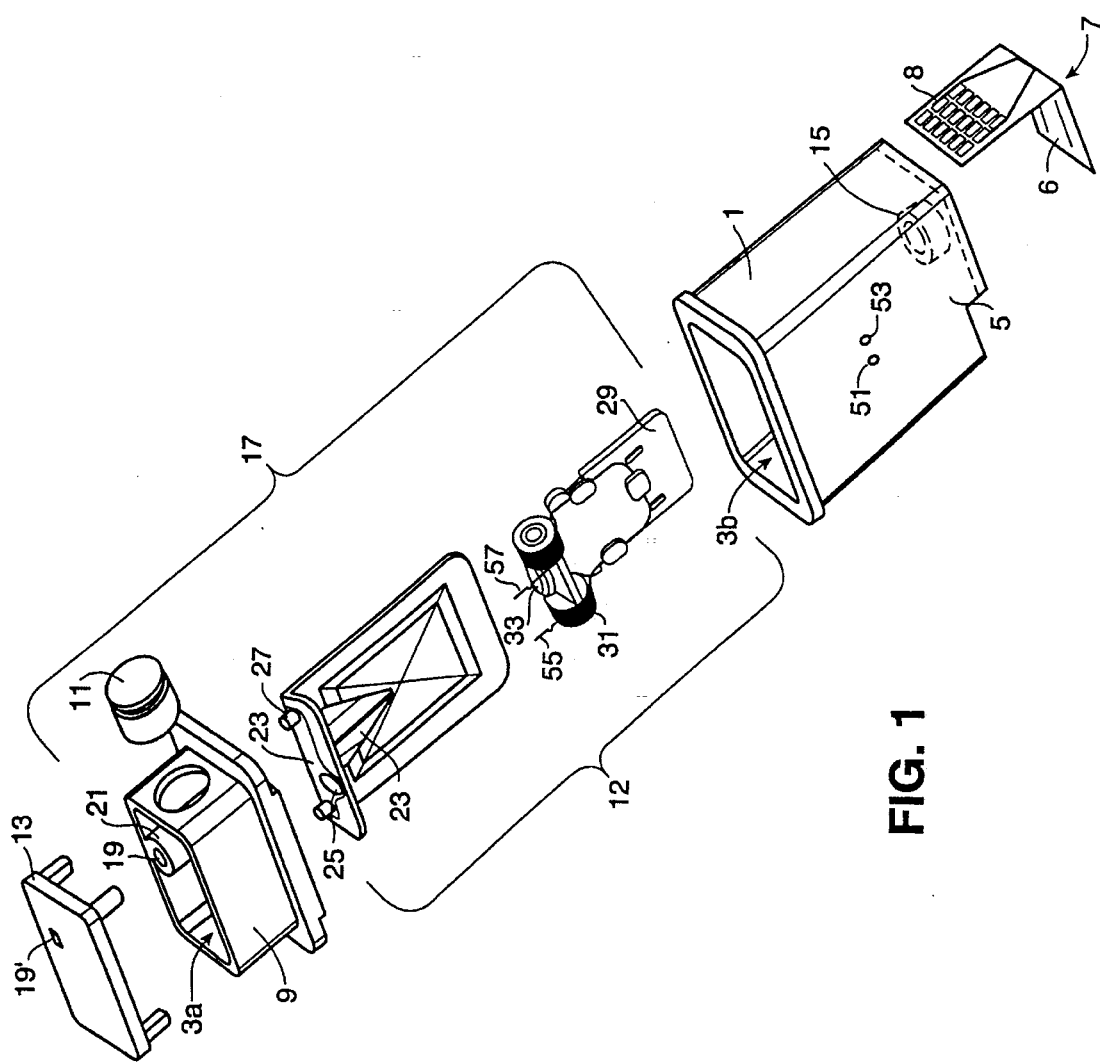
FIG. 1 is an exploded schematic perspective drawing of the preferred embodiment of the present invention.

Referring now to FIG. 1, a pen body 1 includes an ink containment chamber 3 and a printhead snout portion 5. A printhead mechanism 7, generally having a nozzle plate 6 and flex circuit 8 is adapted for cooperative mounting on the snout portion 5. A pen body crown 9 is adapted to cap the pen body 1. A septum member 11 of the pen body crown 9 provides a coupling to a remote, pressurized, ink reservoir (not shown) by any suitable means as would be known in the art. In combination with a crown lid 13, the ink containment chamber 3 is essentially fluid tight. That is, ink flows under pressure from the ink reservoir through the septum member 11 and into the containment chamber 3a. Ink in the containment chamber 3a flows into the pen body containment chamber 3b and snout portion 5 via a pressure regulator valve mechanism 12. From the pen body containment chamber 3b, ink can be supplied directly into to the printhead mechanism 7 via a tube member outlet 15 within the pen body 1.

An out-of-ink condition detector device 17 is adapted to fit within the containment chamber 3a.

In an adaptation as shown in FIG. 1, an ambient atmosphere vent 19 in the form of a crown tube 21 through the pen body crown 9, continuing through the crown lid 13, as lid vent 19', is provided. An inflatable bag member 23 is fixed in its substantially deflated state to a fitment 25. The fitment 25 includes an apertured pipe 27 with the inflatable bag member 23 substantially sealed around fitment 25 and the apertured pipe 27 such that when mated with the pen body crown 9 the apertured pipe 27 is aligned with the ambient atmosphere vent 19, 19' through the crown tube 21. In this manner, the bag member 23 interior is open to the ambient atmosphere but sealed against the ingress of ink that flows under pressure from the ink reservoir through the septum member 11 and into the containment chamber 3a and then through the valve 12 and into containment chamber 3b.

A pressure regulating valve actuating member 29 is mounted via spring member 31 to the pen body crown 9. The spring-biased valve actuating member 29 acts as a lever and includes a valve seat 33 to regulate the flow of ink through the pen body containment chamber 3a, 3b, the valve opening and closing depending upon the use rate of the printhead and subsequent pressure in containment chamber 3b. Basically, the pressure regulator device is a valve lever adapted to regulate ink flow from said reservoir into said pen body by selectively opening and closing a valve based upon fluid pressure level within the pen body. When assembled, the valve actuating member 29 is adjacent the inflatable bag member 23. The valve actuating member 29 is thus adapted to serve as an out-of-ink detector.

In operation, when the ink supply runs dry and flow ceases through the septum 11 into the containment chamber 3a, 3b, the chamber 3 begins to run dry as printing continues via the printhead mechanism 7. As the depleting local supply of ink in the containment chamber 3 decreases, because the containment chamber 3b is sealed against the ambient atmosphere, a low pressure condition occurs. As the pressure drops within the containment chamber 3, ambient air pressure via the ambient atmosphere vent 19, 19' inflates the bag member 23 based upon the increasing pressure differential. The bag member 23 in turn pushes on the valve actuating member 29, increasingly changing its relative position within the chamber 3b as the bag member 23 inflates.

A variety of electrical circuit devices can be integrated into the device to provide an indication that an out-of-ink condition has occurred when the valve actuating member 29 reaches a predetermined position within the chamber 3b. For example, in the embodiment depicted in FIG. 1, if the valve actuating member 29 is constructed of metal, two electrical contacts 51, 53 of an open circuit associated with the flex circuit 8 of the printhead mechanism 7 can be provided through the wall of the pen body 1. Traces from the contacts 51, 53 to the flex circuit 8 can be provided in a suitable manner as would be known in the art. In operation, as the bag member 23 inflates the valve actuating member 29 eventually bridges the contacts 51, 53 and closes the circuit. In other words, the valve actuating member 29 acts as a circuit breaker device.

With the completion of the electrical circuit, an out-of-ink condition indicator (not shown), such as a lighted indicator, a tone producing device, or the like, can warn the user to replenish or replace the ink supply. Preferably, the contact is closed prior to complete starvation of the printhead so that the ink supply can be replenished prior to the pen reaching a de-primed condition.

Alternatively, the ends 55, 57 of a metal spring member 31 could similarly be used to close a circuit.

Figure 2:
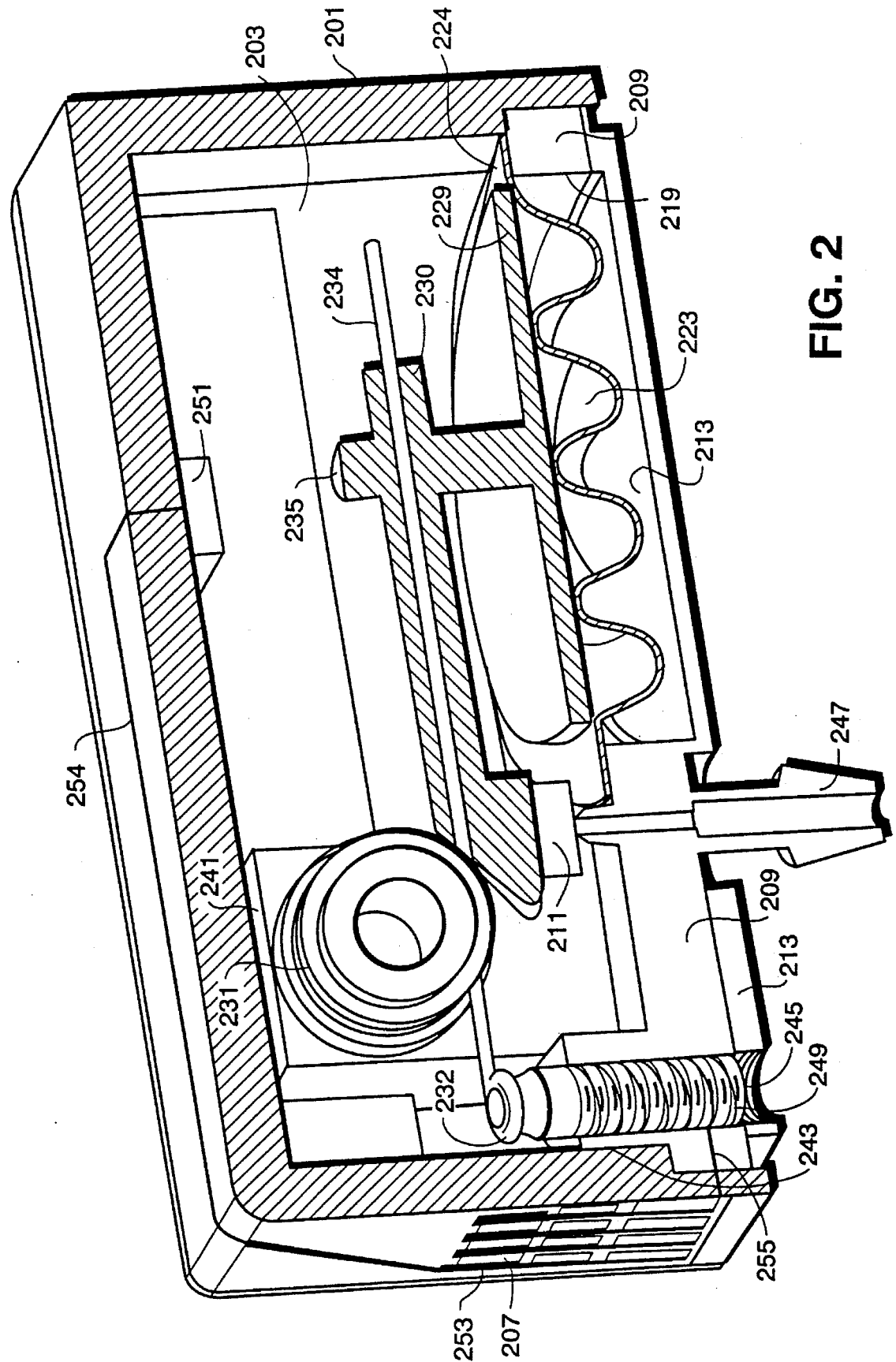
FIG. 2 is a schematic perspective cross-section drawing of a first alternative embodiment of the present invention.
Figure 3:
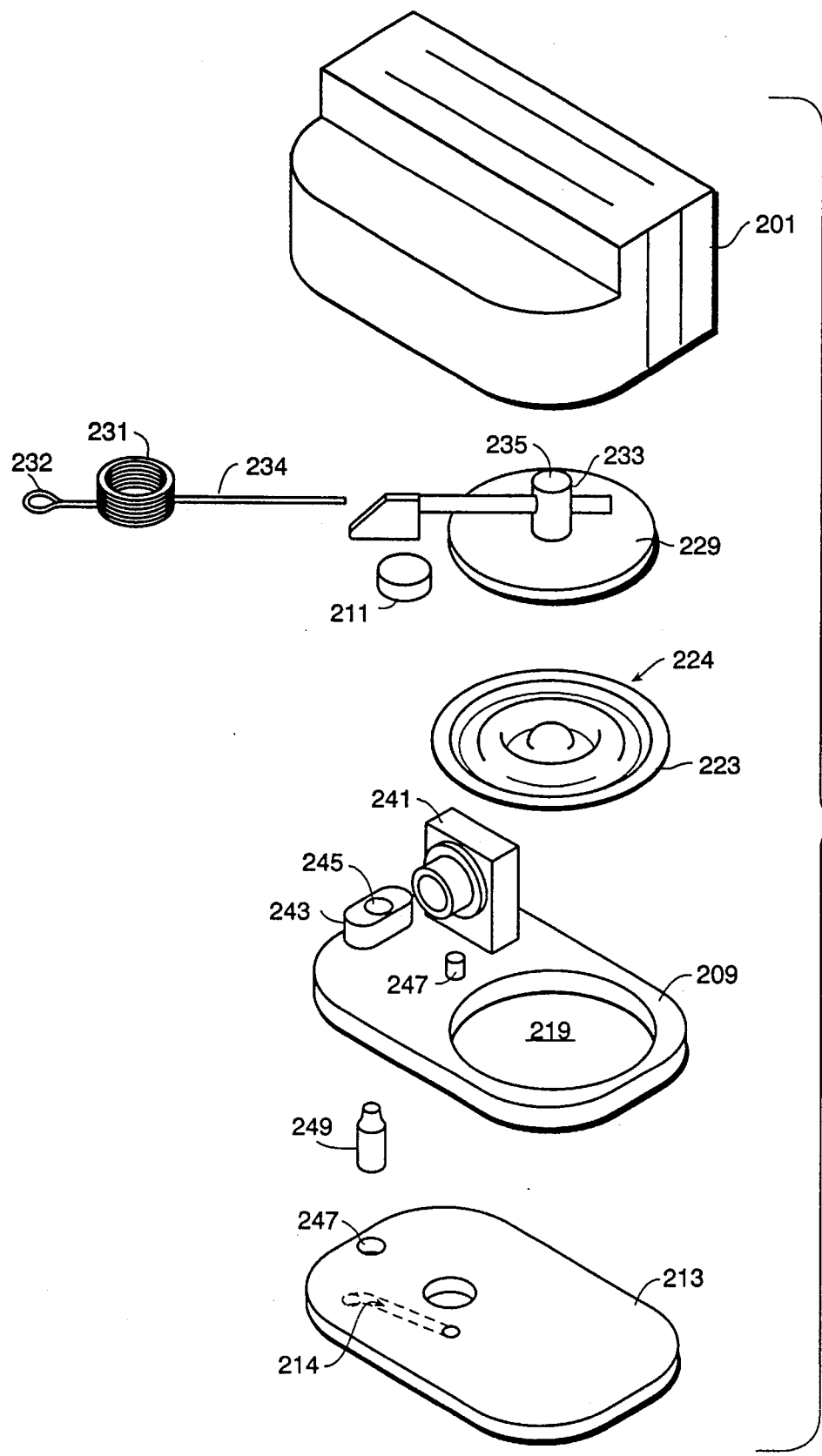
FIG. 3 is an exploded schematic perspective drawing of the present invention as shown in FIG. 2.

A first alternative embodiment is shown in two similar configurations in FIGS. 2 and 3. A pen body 201 includes an ink containment chamber 203. A printhead mechanism (not shown) is adapted for attachment such as at flex circuit 207 or another suitable ink outlet position as dictated by design expediencies. A pen body base member 209 includes a spring mounting post portion 241, a spring tension adjustment screw seat portion 243 having a threaded bore 245 therethrough, and a hollow ink inlet tube member 247.

Within the containment chamber 203, a diaphragm 223 is mounted about its periphery 224 to substantially seal a complementary aperture 219 through the pen body base member 209. A vapor barrier lid 213 having an aperture 247 for access to a spring tension adjustment screw 249 completes the pen body enclosure. The vapor barrier lid 213 is preferably vented by a long, relatively narrow channel 214 to reduce vapor loss in order to leave the diaphragm 223 susceptible to ambient atmospheric pressure.

A torsion spring 231 is mounted on the spring mounting post portion 241 of the pen body base member 209. As more clearly depicted in FIG. 2, the torsion spring 231 is adapted to have a first extremity 232 form a seat mated with the spring tension adjustment screw 249. The distal extremity 234 of the spring is elongated and adapted to carry a plunger arm portion 230 connected to a plunger member 229 via an electrically conductive post member 235. The plunger arm portion 230 is further adapted to carry a valve seat 211 for mating with the ink inlet tube member 247.

Referring again to FIG. 2, an electrical contact 251 is suitably mounted within the containment chamber 203. An electrical trace 254 connects the contact 251 to circuitry 253. Similarly an electrical trace 255 connects the torsion spring 231 to the circuitry 253 via conductive screw 249.

Figure 4:
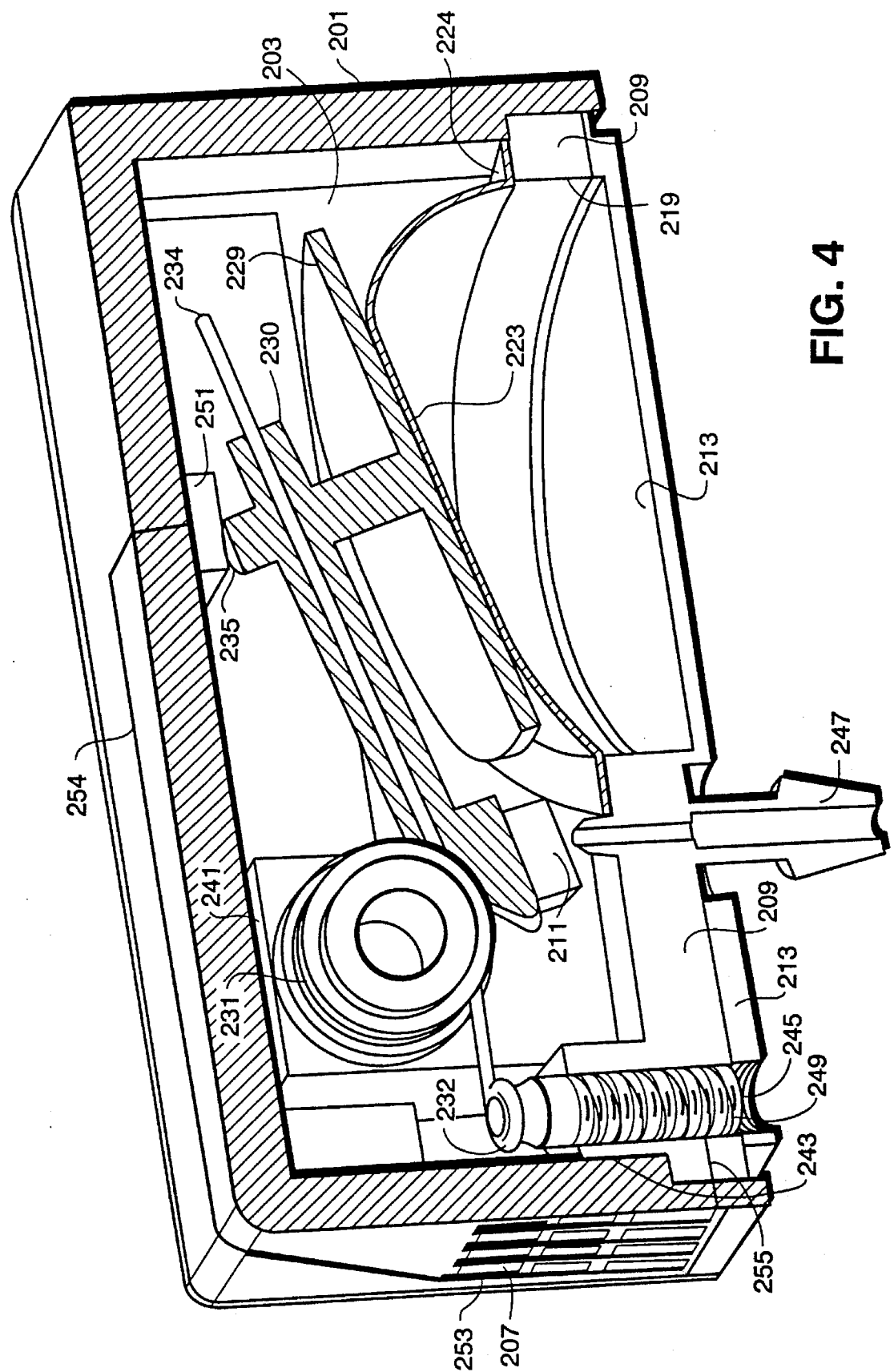
FIG. 4 is a cutaway view of the present invention as shown in FIG. 2 which demonstrates a position of the device of the present invention when an ink chamber is in an out-of-ink condition.

Operation of the embodiment of FIGS. 2 and 3 is shown in FIG. 4. As in the operation of the embodiment shown in FIG. 1, when the pressurized ink supply is depleted, the pressure inside the containment chamber 203 will fall. As the chamber pressure falls below ambient atmospheric pressure, the diaphragm 223 is flexed into the chamber 203 until the post member extremity 235 abuts the electrical contact 251. In this manner, the combination of the post member extremity 235 and torsion spring 231 connected to the electrical circuitry 253 via trace 255 completes a circuit with the electrical contact 251 connected to the electrical circuitry 253 via trace 254. The completion of this circuit is used to trigger an out-of-ink condition as with the previous embodiment.

Figure 5:
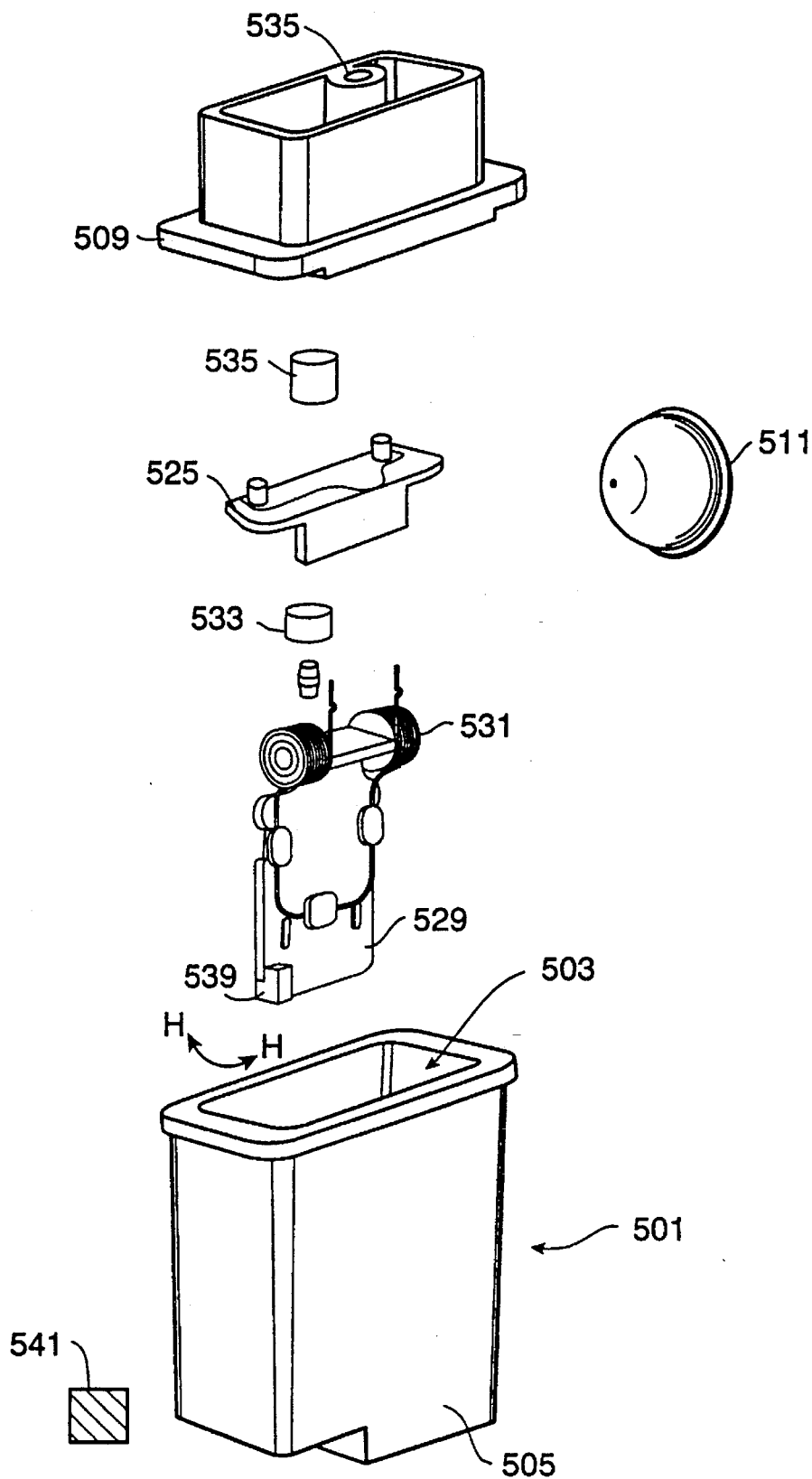
FIG. 5 is an exploded schematic perspective drawing of a second alternative embodiment of the present invention.

Another embodiment of the present invention is shown in FIG. 5. This embodiment has the advantage of requiring no electrical circuitry as part of the pen body itself to provide sensing of an out-of-ink condition.

As in the embodiment shown in FIG. 1, a pen body 501 includes a printhead snout portion 505 and a pen body crown portion 509 to form a substantially sealed ink containment chamber 503. The chamber 503 is in fluid communication with a replaceable or replenishable ink reservoir (not shown) via a suitable septum 511 as would be known in the art. A valve mechanism 525 having a valve seat 533 is mounted via a coupler 535 that is seated in a complementary fitment 537 of the crown portion 509. A valve actuating member 529 is similar to that of the prior embodiments except that a magnet having a high energy product, such as a samarium cobalt or neodymium boron iron magnet 539, is mounted on the valve actuating member 529 at its extremity that exhibits the widest arc of motion (as depicted by arrow "H—H") based upon the pressure of ink in the containment chamber 503. In other words, when the pressurized reservoir is out of ink, the containment chamber 503 will begin to deplete, allowing the biasing spring 531 to move the valve actuating member 529 as a result of an inflatable bag (not shown; substantially identical to the operation of the embodiment of FIG. 1) expansion, thus changing the position of the magnet 539 with respect to the pen body 501.

A Hall-effect sensor 541 (such as that which is commercially available from Allegro Microsystems company of under model no. UGN3113UA) is fixedly mounted with respect to a pen carriage (not shown) of the hard copy apparatus in a position relative to the pen body 501 where it can sense the position of the magnet 539 on the valve actuating member 529 as it moves through the arc indicated by arrow "H—H." At one predetermined such position, the Hall-effect sensor can provide a signal indicative of an out-of-ink condition.

Note that a Hall-effect sensor 541 can be mounted such that it can be used to detect the ink level of each pen in a multi-pen carriage—such as might contain yellow, cyan, magenta, and black pens for color printing. In other words, as head positioning is highly determinative in a hard copy machine printing 1200 dpi, any movement of a magnet 539 from its predetermined PEN FULL position can be sensed. Therefore, not only can this embodiment be used to detect the out-of-ink condition, but also relative levels of ink remaining in a particular containment chamber 503 since the relative position change with respect to the Hall-effect sensor 541 can be determined from the carriage position, providing, for example, indications of how many pages can be printed before a fully starved printhead condition occurs.

Figure 6A:
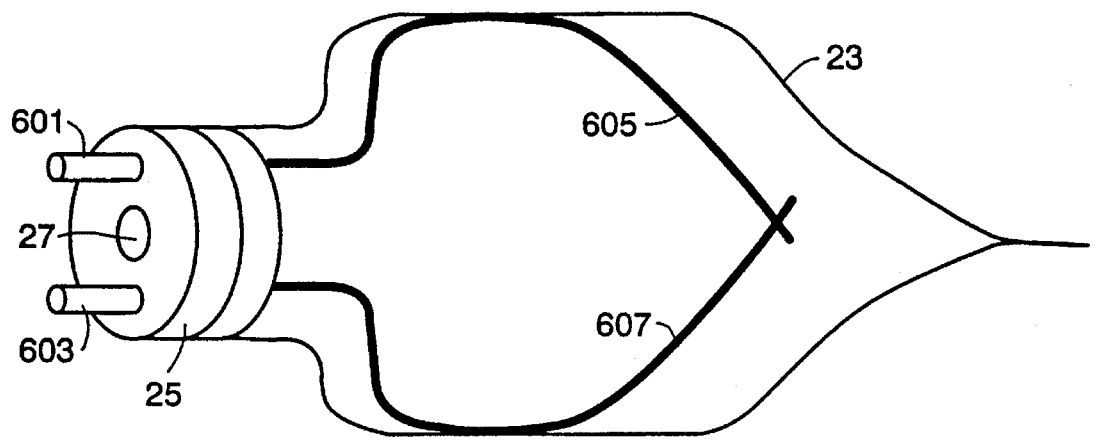
FIG. 6A is a depiction of partially inflated bag member including electrical contacts in a closed position.
Figure 6B:
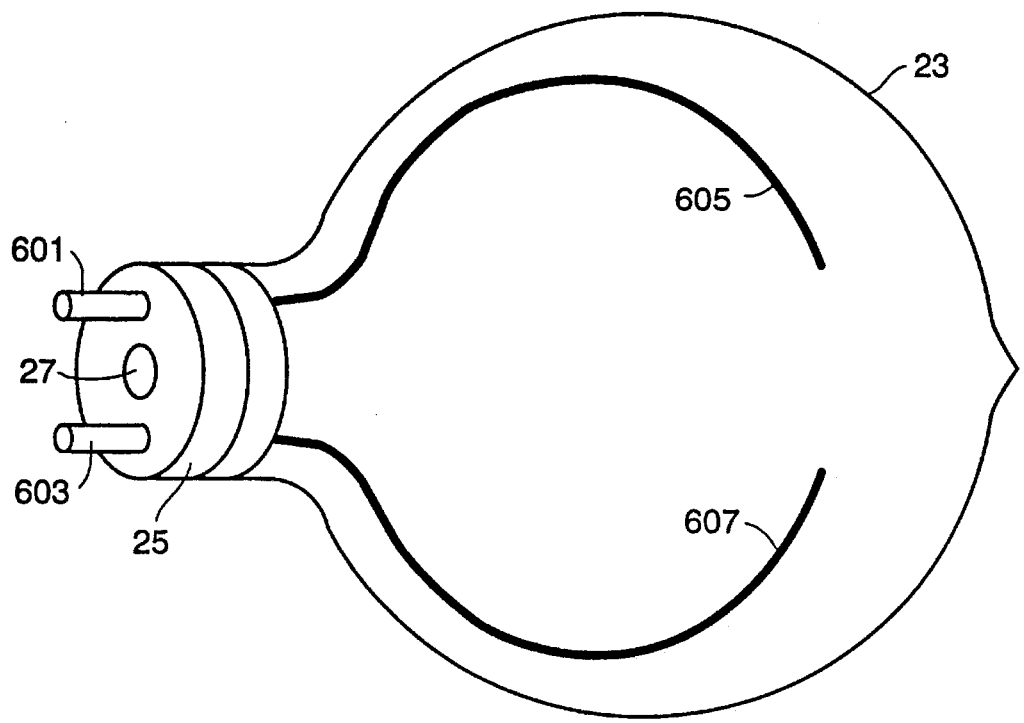
FIG. 6B is a depiction of a fully inflated bag member including electrical contacts in an open position.

A further embodiment is shown in FIGS. 6A and 6B. In this embodiment, electrical circuit elements used to create a signal indicative of an out-of-ink detected condition are incorporated into the bag member 23. The fitment 25 includes the vent 27 and two electrical contact pins 601,603. Two flexible electrical contact members 605, 607, such as wire filaments, remain in contact as long as the bag member 23 is deflated or partially inflated as shown in FIG. 6A. Once the bag member 23 is fully inflated as the pen body 1 containment chamber 3b runs out of ink, the contact members 605, 607 separate as shown in FIG. 6B. As a result, the circuit via contact pins 601,603 is broken. The opening of the circuit can be used to again provide a signal indicating an out-of-ink condition. A delay may be incorporated to ensure the open circuit is a persistent condition rather than an incidental loss of contact.

The foregoing description of the preferred and alternative embodiments of the present invention has been presented for purposes of illustration and description. It is not intended to be exhaustive or to limit the invention to the precise form disclosed. Obviously, many modifications and variations will be apparent to practitioners skilled in this art. Similarly, any process steps described might be interchangeable with other steps in order to achieve the same result. The embodiments were chosen and described in order to best explain the principles of the invention and its best mode practical application to thereby enable others skilled in the art to understand the invention for various embodiments and with various modifications as are suited to the particular use contemplated.

It is intended that the scope of the invention be defined by the claims appended hereto and their equivalents.

What is claimed is:

1. A level sensing device for a fluid containment chamber having a fluid inlet and a fluid outlet, said fluid inlet coupling said containment chamber to a reservoir having a supply of fluid, comprising:

controlling means for controlling flow of fluid through said containment chamber and for regulating fluid pressure within said containment chamber such that said chamber is substantially filled with fluid via said controlling means as long as a supply of fluid remains in said reservoir;

moving means, operatively combined with said controlling means, for moving said controlling means to a predetermined position as said containment chamber is drained of fluid following depletion of said supply of fluid in said reservoir; and detecting means, cooperative with said controlling means, for providing a signal indicative of said controlling means reaching said predetermined position, wherein said controlling means has a lever with a magnet fixed thereon which moves from an inlet closed position to said predetermined position where said magnet interacts with said detecting means.

2. The device as set forth in claim 1, wherein said controlling means further comprises:

activating means adapted to close an electrical circuit for activating said detecting means.

3. The device as set forth in claim 1, wherein said controlling means further comprises:

activating means adapted to open an electrical circuit for activating said detecting means.

4. The device as set forth in claim 1, wherein said detecting means further comprises:

a Hall-effect sensor.

5. The device as set forth in claim 4, wherein said Hall-effect sensor is adapted to provide signals indicative of said closed position, said predetermined position, and at least one intermediary position.

6. The device as set forth in claim 1, wherein said moving means further comprises:

an inflatable member, adjacent said controlling means, adapted to inflate under ambient atmospheric pressure against said controlling means as said containment chamber is drained of fluid following depletion of said supply of fluid in said reservoir.

7. A fluid level sensing device for a fluid pressure regulated containment chamber, having a valve actuating means adapted for motion dependent upon fluid pressure level in said containment chamber to control ingress of fluid from a fluid supply, comprising:

means, cooperatively combined with said valve actuating means, for sensing depletion of fluid in said containment chamber and for moving said valve actuating means based upon a negative pressure condition in said containment chamber in response to a lack of a positive pressure level in said containment chamber due to lack of available fluid from said fluid supply;

detecting means for detecting when said valve actuating means has reached at least one predetermined position within said containment chamber, wherein said detecting means is affixed to said means for sensing and for moving; and indicating means, cooperative with said detecting means, for providing a signal indicative that said detecting means has achieved said predetermined position.

8. The device as set forth in claim 7, wherein said pressure sensing means further comprises:

an inflatable bag member, and venting means for venting said bag member to ambient atmospheric pressure, whereby said inflatable bag member inflates when a negative pressure condition exists within said containment chamber.

9. The device as set forth in claim 7, wherein said detecting means comprises:

means for closing an electrical circuit such that said indicating means provides said signal.

10. The device as set forth in claim 7, wherein said detecting means comprises:

means for opening an electrical circuit such that said indicating means provides said signal.

11. The device as set forth in claim 7, wherein said detecting means comprises:

a magnet fixedly mounted on said valve actuating means.

12. The device as set forth in claim 11, wherein said indicating means comprises:

a Hall-effect sensor adapted for predetermined positioning with respect to said valve actuating means.

13. An ink level detection apparatus for a pen system, having a pen body, an ink reservoir and means for controlling the flow of ink from said ink reservoir into said pen body, comprising:

means for regulating fluid pressure within said pen body integrated with said device for controlling the flow of ink form said ink reservoir into said pen body;

moving means, operative combined with said means for regulating, for moving said means for controlling from a relative position for controlling flow of ink from said reservoir into said pen body to at least one predetermined other position as said pen body is depleted of ink; and detecting means, mounted with respect to said pen body, for detecting when said means for controlling has moved to said at least one predetermined other position.

14. The apparatus as set forth in claim 13, further comprising:

said means for regulating is a valve lever adapted to regulate ink flow from said reservoir into said pen body by selectively opening and closing a valve controlling said ink flow based upon fluid pressure level within said pen body; and said moving means includes a fitment for mounting said means for regulating within said pen body and an inflatable bag member, fixedly mounted on said fitment adjacent said means for regulating, having a vent to ambient atmospheric pressure such that said bag member inflates under influence of said ambient atmospheric pressure as said fluid pressure level falls beyond a predetermined level.

15. The apparatus as set forth in claim 14, wherein said detecting means comprises:

a magnet fixedly mounted on said means for regulating; and a Hall-effect sensor fixedly mounted with respect to said pen body such that change of relative position of said magnet within said pen body is detected by said Hall-effect sensor.

16. The apparatus as set forth in claim 13, wherein said detecting means comprises:

electrical circuitry for providing a signal indicative of said means for regulating being located at said at least one predetermined other position; and circuit breaker means, integrated with said means for regulating, for opening and closing electrical contact through said electrical circuitry.

17. A pressure regulated ink-jet pen system comprising:

a replenishable ink supply;

a pen body having a printhead;

a liquid ink containment chamber within said pen body;

a valve coupling said containment chamber to said pressurized replenishable ink supply;

a valve actuator device adapted for motion dependent upon a predetermined positive pressure level of ink in said containment chamber to control ingress of ink from said ink supply into said containment chamber; and an ink level sensing device, including pressure sensing means, operatively vented to ambient atmospheric pressure and combined with said valve actuator device for sensing a drop in pressure within said containment chamber below said ambient atmospheric pressure and for moving said valve actuator device to at least one predetermined position in response to said send drop in pressure; and detecting means, operatively associated with said valve actuator means device, for providing a signal representative of said valve actuator device having reached a predetermined position.

18. The system as set forth in claim 17, wherein said detecting means comprises:

electrical circuitry wherein said valve actuator includes a selective circuit breaker.

19. The system as set forth in claim 17, wherein said detecting means comprises:

a magnet fixedly mounted on said valve actuator for motion from a predetermined position when said containment chamber is filled with ink through a series of predetermined positions representative of lowering levels of ink, including an out-of-ink condition position; and a Hall-effect sensor fixedly mounted with respect to said valve actuator such that each of said predetermined positions is detected.

20. An out-of-ink condition signal generator for an ink-jet pen system having a pressurized ink reservoir containing a depletable supply of ink therein, a pen body having an ink chamber, a printhead mechanism, and a pressure regulator coupling said ink reservoir with said ink chamber to transfer ink from said ink reservoir to said ink chamber, comprising:

electrical means for providing a signal indicating an out-of-ink condition in said system;

a pressure sensing device mounted within said pen body ink chamber;

fitment means for coupling said pressure sensing device to said pressure regulator, having a vent that subjects said pressure sensing device to ambient atmospheric pressure such that a drop in pressure in said ink chamber below ambient atmospheric pressure causes said pressure sensing device to move said pressure regulator to a predetermined position; and circuit breaker means operatively attached to said pressure regulator for selectively making and braking continuity of said electrical means when said pressure regulator is at or off said predetermined position, respectively.

21. An out-of-ink condition signal generator for an ink-jet pen system having a pressurized ink reservoir containing a depletable supply of ink therein, a pen body having an ink chamber, a printhead mechanism, and a pressure regulator coupling said ink reservoir with said ink chamber to transfer ink from said ink reservoir to said ink chamber, comprising:

a magnet fixedly mounted to said pressure regulator;

a pressure sensing device mounted within said pen body ink chamber;

fitment means for coupling said pressure sensing device to said pressure regulator, having a vent that subjects said pressure sensing device to ambient atmospheric pressure such that a drop in pressure in said ink chamber below ambient atmospheric pressure causes said pressure sensing device to move said pressure regulator to a predetermined position; and a Hall-effect sensor fixedly mounted in said system with respect to said pressure regulator for detecting when said pressure regulator has reached said predetermined position.

22. An out-of-ink condition signal generator for an ink-jet pen system having a pressurized ink reservoir containing a depletable supply of ink therein, a pen body having an ink chamber, a printhead mechanism, and a pressure regulator coupling said ink reservoir with said ink chamber to transfer ink from said ink reservoir to said ink chamber, comprising:

electrical circuit means for providing a signal indicating an out-of-ink condition in said system;

a pressure sensing device mounted within said pen body ink chamber and having a first predetermined shape;

fitment means for coupling said pressure sensing device to said pressure regulator, having a vent that subjects said pressure sensing device to ambient atmospheric pressure such that a drop in pressure in said ink chamber below ambient atmospheric pressure causes said pressure sensing device to move said pressure regulator to a predetermined position; and circuit breaker means, within said pressure sensing device, for breaking electrical continuity for said electrical circuit means when said pressure regulator has changed to said second predetermined shape.

* * * * *